Aug. 25, 1970

M. H. RAINES 3,525,271

SEGMENTED GEAR STRUCTURE AND MANNER OF SECURING AND REMOVING
THE SAME FROM A SHAFT

Filed Sept. 6, 1968

INVENTOR
MOFFETT H. RAINES

Frank Plya

ATTORNEY

Aug. 25, 1970  M. H. RAINES  3,525,271
SEGMENTED GEAR STRUCTURE AND MANNER OF SECURING AND REMOVING
THE SAME FROM A SHAFT
Filed Sept. 6, 1968  2 Sheets-Sheet 2
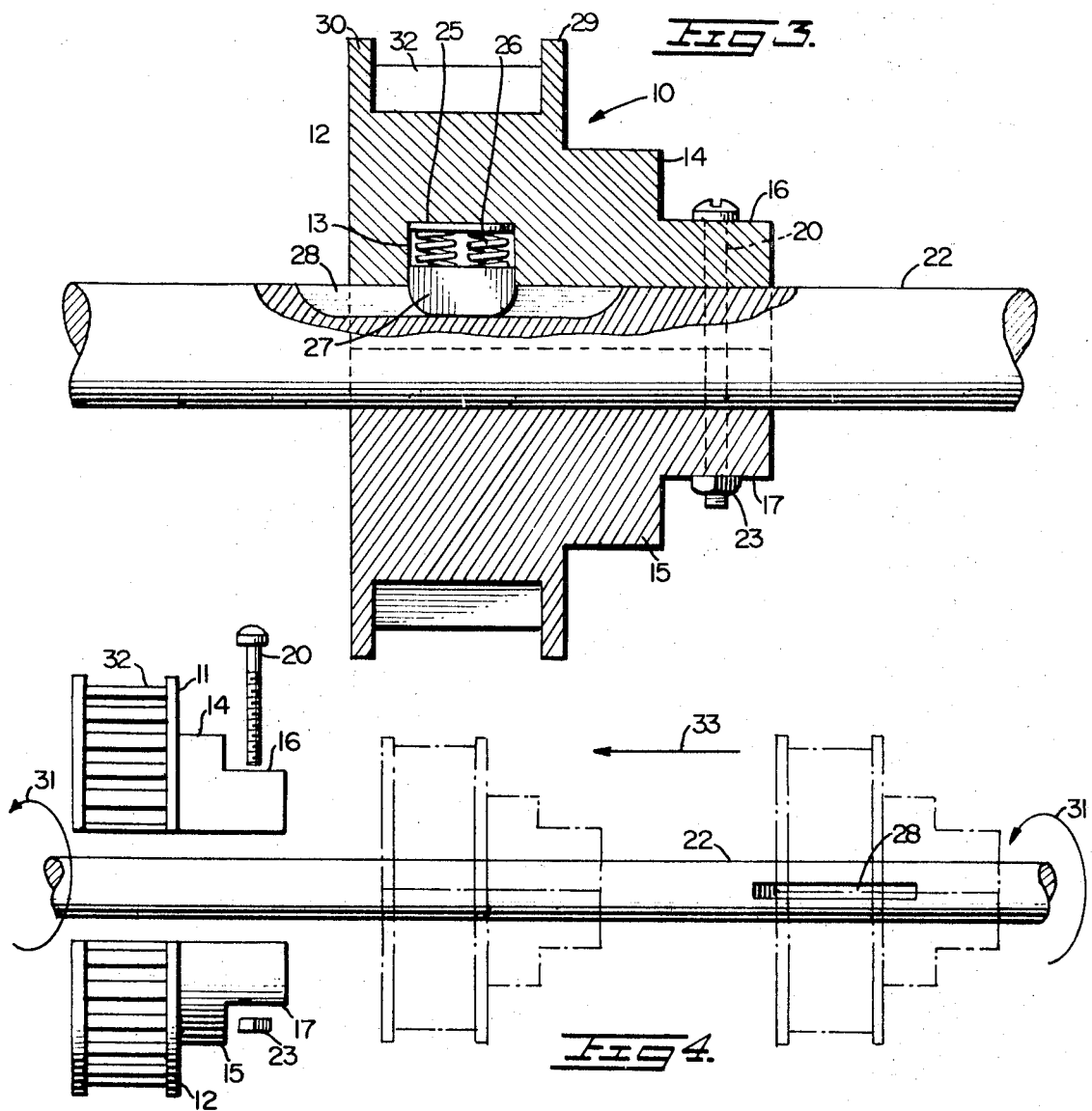
INVENTOR
MOFFETT H. RAINES
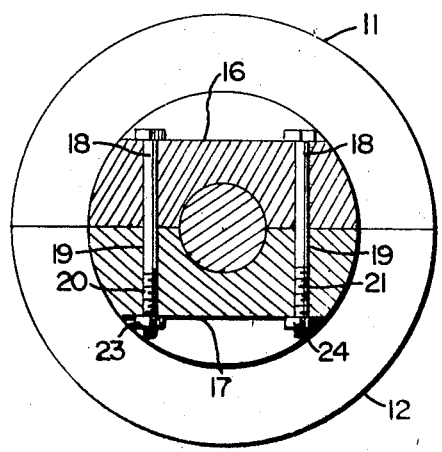
ATTORNEY United States Patent Office 3,525,271
Patented Aug. 25, 1970

3,525,271
SEGMENTED GEAR STRUCTURE AND MANNER OF SECURING AND REMOVING THE SAME FROM A SHAFT
Moffett H. Raines, Rte. 1, Newport, Va. 24128
Filed Sept. 6, 1968, Ser. No. 768,585
Int. Cl. F16h 55/12, 55/30; B60b 27/06
U.S. Cl. 74—450                                   3 Claims

ABSTRACT OF THE DISCLOSURE

A segmented gear structure having a spring pressed key mounted therein which cooperates with a bevelled slot formed on a shaft so as to enable the gear to be removed from the shaft either when the shaft is rotating or when the shaft is stationary.

BACKGROUND OF THE INVENTION

In machines in general, particularly where a plurality of shafts derive their power from a common source of power, oftentimes a gear or a plurality of gears mounted on one of these shafts must be replaced due to wear or breakage of a gear tooth or the like. In instances of this type, it is common to shut down the source of power common to all of the rotating shafts so as to enable one to remove and replace the defective gear from the one shaft. Or, in instances where a plurality of shafts, again all deriving their source of power from a common source, are each provided with gears thereon and such gears must be replaced due to a malfunctioning thereof due to a number of reasons, such as a gear cog breaking down or the like, it is sometimes more desirable to replace the damaged gear only at the end of a given period of operation since to stop all of the rotating shafts to effect the replacement of a damaged gear thereon results in undesirable stoppage of the entire machine and rotating shafts which account for a loss of working time of the machine due to this stoppage thereof.

With the above in mind, it is the primary object of the invention to provide a gear structure which will permit for the removal of a damaged gear wheel from a shaft either when the shaft is rotating or when the shaft is completely stopped and to effect the replacement thereof on the said shaft and when so mounted thereon it will automatically lock itself in place.

Another object of the invention is to form a tapered guide-way in a shaft which is adapted to cooperate with a spring pressed key which is secured within a recess formed in one portion of a segmented gear for locking the gear onto the shaft.

Another object of the invention is to provide a tapered key which is slidably mounted within a slot formed in one wall of a segmetned gear and which is adapted to cooperate with a tapered slot formed along a shaft so as to enable the gear assembly to be removed from the shaft by the application of tapping blows against the gear assembly thus causing the gear assembly with the key therein to ride over the bevelled portion of the slotted shaft to thus disengage the key with the shaft thereby permitting the gear assembly to be removed from the shaft and to be replaced with a new gear or gears.

Other objects of the invention will appear hereinafter, the novel features and combination being set forth in the appended claims.

BRIEF DESCRIPTION OF THE DRAWINGS

In the accompanying drawings.

FIG. 3 is a horizontal transverse sectional view taken along the lines 3—3 of FIG. 1, looking in the direction of the arrows.

FIG. 4 is a sequential view showing the assembly and operational positioning of the gear on a shaft while the shaft is still rotating, and, FIG. 5 is a detailed vertical sectional view taken along the lines 5—5 of FIG. 1 looking in the direction of the arrows.

PREFERRED EMBODIMENT OF THE INVENTION

Figure 1:
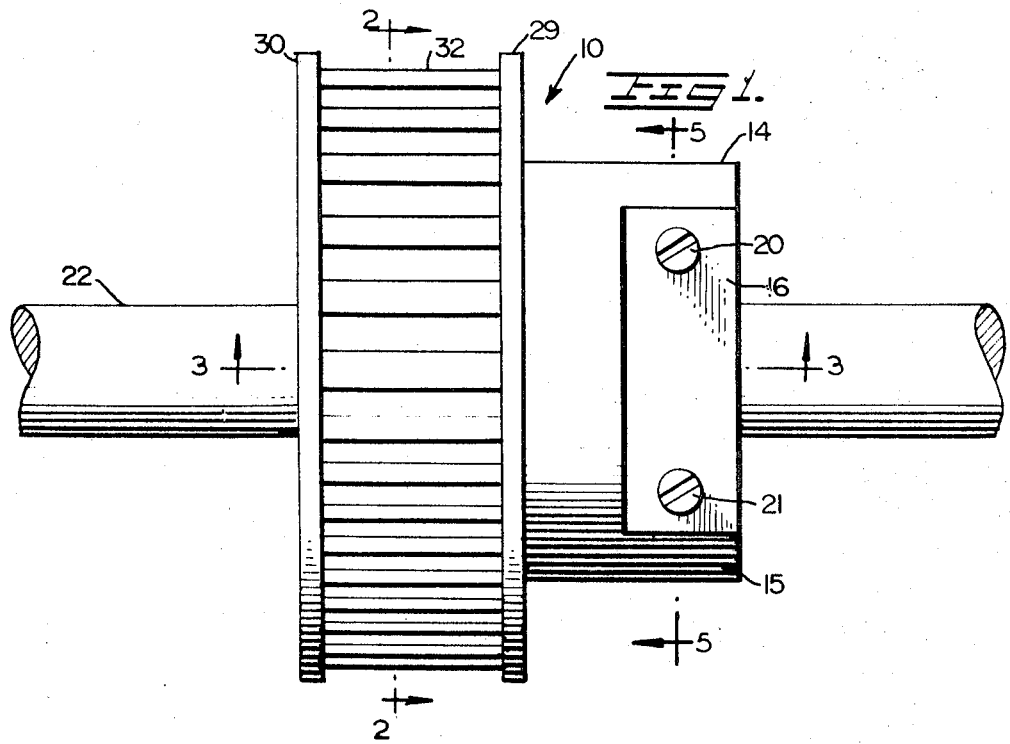
FIG. 1 is an elevational view of the segmented gear assembly constructed in accordance with the instant invention.

In the manufacture of segmented gears such as sprocket wheels and other wheel structure, it is frequently the practice to form such wheels of two or more segments which are joined together to constitute the wheel. This practice makes it possible to assemble and disassemble the wheel on a shaft while the latter is stopped from rotating and is maintained in its supporting structure. However, in the present invention, means are provided whereby a segmented gear or wheel can be placed on or removed from a shaft while the latter is still mounted for rotational movement thus obviating the necessity of stopping the rotating shaft for removing or placing a segmented gear thereon.

Referring now to the drawings, there is shown therein a gear structure 10 comprising gear segments 11 and 12 each of the latter extending through an arc of 180° and joined in the shaft a key-way 28 which as shown more clearly in FIG. 3 of the drawings, is bevelled at either end thereof for a purpose to be more fully described hereinafter.

Figure 2:
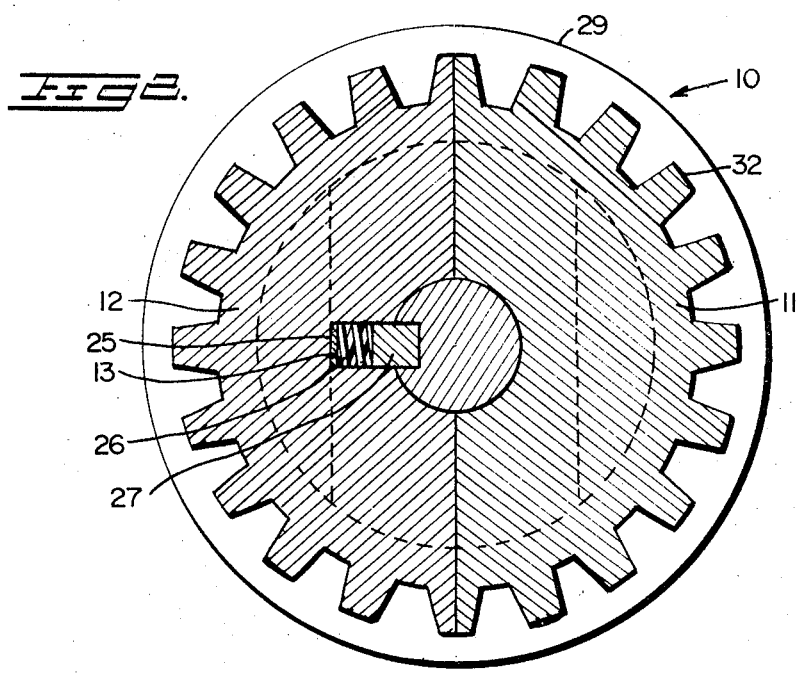
FIG. 2 is a detailed vertical sectional view taken along the lines 2—2 of FIG. 1, looking in the direction of the arrows.

It should be pointed out at this time that a slight tolerance is provided between the gear segments 11 and 12 and the shaft 22 when the parts are in their assembled relation as shown more particularly in FIGS. 2, 3 and 5 of the drawings. This slight tolerance between the shaft 22 and gear segments 11 and 12 permit for movement of the gear segments along the shaft 22 and when the key 27 encounters the key-way 28, the key enters the key-way and springs 26 exert a force thereagainst to seat the key in the aforementioned key-way for locking the gear segments onto the shaft.

As stated previously, both ends of the key and key-way are bevelled so as to facilitate the entry and withdrawal of the key from the key-way in a manner to be more fully described hereinafter. While I have shown the key-way in the drawings as being of sufficient length as to accommodate a gear positioned thereover, it is obvious that an elongated key-way can be formed along the shaft so as to accommodate a plurality of gears mounted thereon, provided of course, both ends of the key-way are bevelled for the purpose set forth above. Also, while I have shown a pair of spring members 26 for exerting a downward or outward force against the key 27 within the recess 13, it is obvious that as many resilent or spring members may be employed for this purpose as is deemed necessary for accomplishing the desired results, namely, that of urging the key 27 outwardly of the recess 13 and into the key-way 28. The gear segments 11 and 12 may be formed by casting or by any other well known method and are identical in structure except for the fact that one such gear segment illustrated in the drawings at 12 is formed with a recess 13 for a purpose to be more fully described hereinafter.

The gear segments 11 and 12 are each provided with hub structures 14 and 15, each of which are provided with diametrically opposed flattened faces 16 and 17, each provided with aligned openings 18 and 19 for the reception therein of bolt members 20 and 21 which are employed for securing the gear segments onto the shaft 22 by means of threaded nuts 23, 24.

While I have shown and described a specific manner of securing the gear segments onto a shaft, it is obvious that other means can be employed for securing the gear segments in proper position on a shaft for rotation therewith.

As shown more clearly in FIGS. 2 and 3 of the drawings, a recess 13 is formed in segment 12 and secured therein in any manner is a plate 25 which mounts springs 26 to which is affixed in any manner a key 27 which is tapered at both ends thereof for a purpose to be more fully described hereinafter.

The shaft 22 is adapted to be rotated through any suitable arrangement with a source of power, not shown, and may have splined thereto as many segmented gears as is deemed required for the number of gears to be in mesh with and rotated by the segmented gears on the shaft. For each segmented gear to be mounted for rotation with the shaft 22, there is formed a key-way 28.

As can best be seen in FIGS. 2 and 3 of the drawings, each gear segment is provided with side flanges for a purpose to be more fully described hereinafter.

The manner of operation of the invention is as follows: The shaft 22 with gear segments 11 and 12 are mounted for rotation therewith when the key 27 has been extended into the key-way 28. The shaft 22 derives its rotational movement from a power source, not shown, and is adapted to rotate in the direction of the arrows 31 shown in FIG. 4 of the drawings. The gear assembly 10 is adapted to mesh with a driven gear, not shown, which is of such a width as to extend between the flanges 29 and 30 and to be held therebetween by reason of the aforesaid flanges. Of course, during normal operation of the rotating shaft 22, the teeth of the driven gear, not shown, are in mesh with the teeth 32 of the segmented gear 10. When, for any reason, it is found necessary to remove and replace the gear assembly 10 from the shaft 22, all that need be done is to remove the driven gear (not shown) away from the gear assembly 10 and while the shaft 22 is still rotating, one with a suitable tool such as a hammer or the like can, by tapping on either side of the gear 10, cause the same to move along the shaft 22 until such time as the key disengages with the key-way. Such movement of the gear is indicated generally in the direction of the arrow 33 in FIG. 4 of the drawings. With the key thus removed from the key-way the shaft 22 is still rotating but by reason of the slight tolerance between the gear 10 and the shaft, the gear no longer rotates therewith and thus enables one to remove the connecting means for the gear segments 11 and 12 thus permitting the gear segments to be taken off the rotating shaft. Following the removal thereof, as aforesaid, a new gear may be substituted for the worn or damaged gear. Since the gear segments are capable of lateral movement along the shaft by reason of the key and key-way connection between the parts and the slight tolerance between the gear segments and the rotating shaft, the flanges 29 and 30 will contain therewith the driven gear (not shown) and thus insure alignment of both the drive and driven gear.

While I have described the invention in connection with moving the driven gear (not shown) away from the drive gear and rotating shaft so as to enable one to replace a gear thereon while the same is still rotating, it is obvious the same results can be accomplished where the rotating drive shaft and drive gear mounted thereon can be swung away from the driven gear thus de-meshing the gears and rendering the removal and replacement of gears on a rotating shaft in the manner aforesaid.

Obviously, those skilled in the art may make various changes in the details and arrangement of parts without departing from the spirit and scope of the invention as defined by the claims appended hereto, and applicant therefore wishes not to be restricted to the precise construction herein disclosed.

Having thus described and shown an embodiment of the invention what it is desired to be secured by Letters Patent of the United States is:

1. A segmented gear wheel adapted for removal from a continuously rotating shaft comprising means for securing said segmented gear wheel parts in spaced relation to said rotating shaft, a key-way formed in said shaft, a spring pressed key mounted for limited movement within a recess formed in said segmented gear, said key and said key-way each being bevelled at their outer ends to facilitate the entry and exit of said key from said keyway.

2. The structure recited in claim 1 wherein said segmented gear wheel is provided with flanges on either side thereof for containing a gear wheel between the confines of the space between the said flanges.

3. The structure recited in claim 1 wherein said key and key-way form the only means for locking said segmented gear wheel onto said rotating shaft.

References Cited

UNITED STATES PATENTS 3,319,413   5/1967   Costner _____ 74—450 X

LEONARD H. GERIN, Primary Examiner

U.S. Cl. X.R.

74—243; 287—43, 52.03